May 3, 1927.
H. P. WILLIAMS
TRAILER COUPLING
Filed Oct. 4, 1926
1,626,993
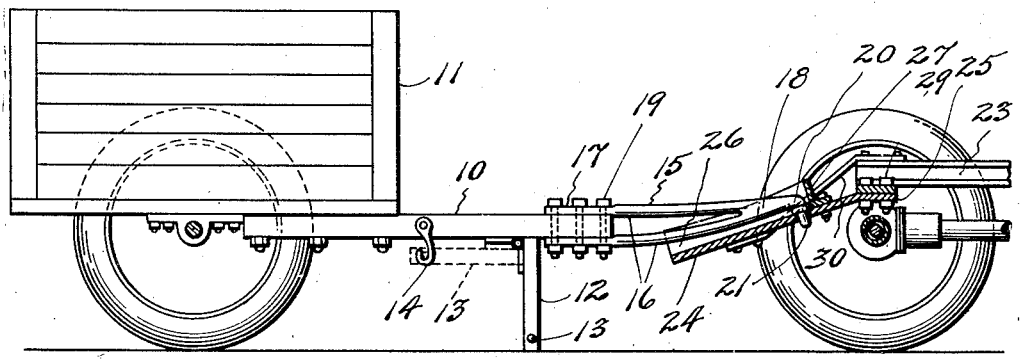
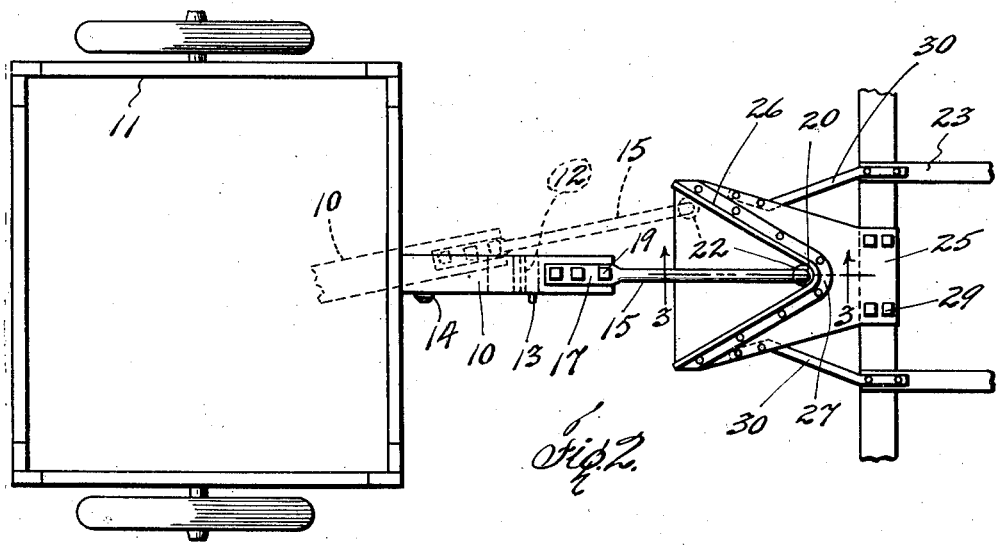
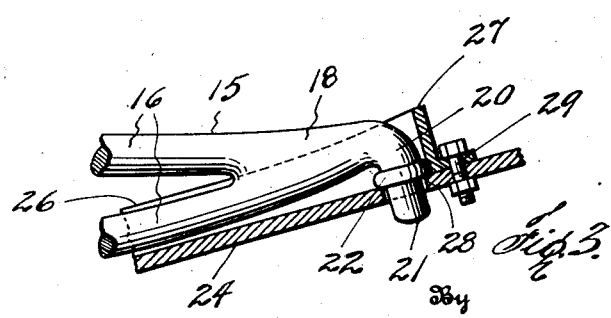
Inventor
H. P. Williams Patented May 3, 1927.

1,626,993

UNITED STATES PATENT OFFICE.

HUBERT P. WILLIAMS, OF HAMLIN, TEXAS.

TRAILER COUPLING.

Application filed October 4, 1926. Serial No. 139,330.

This invention relates to new and useful improvements in trailer couplings.

The object of the invention is to provide means for automatically coupling a motor vehicle and a trailer including a tongue carried by the trailer having a coupling hook and a plate carried by the vehicle having a socket for the hook and means for guiding the hook to the socket when the vehicle is backed toward the trailer.

A further object of the invention is to provide means for supporting the tongue in coupling position together with a wide angle guide for directing the bill of the hook to the socket.

An important object of the invention is to provide a guide having a guard at its center for preventing the hook jumping over the guide when about to enter the socket.

A construction designed to carry out the invention will be hereinafter described, together with other features of the invention.

The invention will be more readily understood from a reading of the following application and by reference to the accompanying drawings, in which an example of the invention is shown and wherein:

Fig. 1 is a view of a trailer and a portion of a motor vehicle equipped with a coupling constructed in accordance with my invention and being partly in elevation and partly in section, Fig. 2 is a plan view of the same, and Fig. 3 is an enlarged sectional view taken on the line 3—3 of Fig. 2.

In the drawings the numeral 10 designates the tongue of a trailer 11 of the two-wheel or cart type, although the invention may be applied to the four wheel type. To the under side of the tongue, I hinge a prop or leg 12 provided near its lower end with a pin 13, so that when the prop is swung back and folded up against the bottom of the tongue, it may be so held by engaging a hook 14 with said pin. The prop may, however, be hinged and fastened in any suitable manner.

On the front end of the tongue, I fasten a hook 15. This hook comprises a pair of arms 16 flattened at their rear ends to form straps 17 and merged together at their forward ends to form a shank 18. The straps engage the top and bottom of the tongue and are fastened by bolts 19. While the top arm 16 is comparatively straight, the under arm is curved upwardly to the shank.

The shank converges toward its forward end and is merged into a down-turned bill 20 having a rounded end or nose 21 and an annular stop collar 22 near its upper end. The hook is made of metal; while the tongue may be made of wood or metal. The prop supports the hook in coupling position. The hook is given sufficient upward curvature to hold the bill high enough for coupling and to permit the prop to support a loaded trailer, without the latter overbalancing rearwardly.

To the rear end of a motor vehicle 23, I secure a coupling member including a plate 24, a bracket 25, a guide 26 having a guard 27 and a socket 28. The plate flares outwardly from the bracket and also inclines downwardly therefrom. The bracket may be suitably shaped to fit the rear spring or frame member of an automobile, truck, tractor, or the like and is secured thereto by bolts 29. In order to hold the plate rigidly and properly support it, side brace bars 30 have their lower ends bent and secured to the under sides of the plate and their upper ends fastened to the frame of the vehicle.

The plate is low enough at its bottom to pass under the nose 21 of the bill 20, but the socket 28 is at such an elevation as to cause the hook 15 to elevate the tongue, when the nose rides up the plate, thus lifting the prop from the ground and so holding it, due to the collar 22, even after the coupling is made. The prop may be easily swung up and fastened to the tongue.

An important feature of the invention is the guide 26. This is preferably formed of an angle bar bent to a V-shape, but rounded at its apex or center to provide clearance for the collar 22. The angle bar is riveted or otherwise secured to the plate. At its central portion the vertical member is increased in height to form the guard 27 opposite the socket 28. By observing Fig. 3 it will be seen that the guard extends high enough to function; also that when the bill 21 is in the socket and supported by the stop collar 22, the curved under arm 16 and the shank 18 clear the plate, thus permitting a free lateral swinging movement of the tongue, when a turn is made.

In effecting a coupling the tongue 10 is supported by the prop 12 as is shown in Fig. 1. The trailer 11 may thus be loaded and left standing in the field or elsewhere. When it is desired to couple the trailer, the motor vehicle 23 is backed up so that the plate 24 is positioned under the bill 20 of the hook 15 and within the guide 26. This may be effected as is shown in dotted lines in Fig. 2. As the vehicle continues to back the nose 21 of the bill 20 rides up the plate, thus elevating the hook and lifting the prop from the ground. The bill is guided into the socket 28 and the collar 22 acts as a stop and a pivot support. The prop is fastened by the hook 14 and the vehicles then driven off. In case the motor vehicle should back up quickly and the bill 20 should ride rapidly up the plate, the guard 27 will prevent its jumping over the guide.

Various changes in the size and shape of the different parts, as well as modifications and alterations, may be made within the scope of the appended claims.

What I claim, is:

1. In a trailer coupling, the combination of a hook for connection to a trailer tongue, a down-turned bill on the free end of the hook, an inclined plate having a bracket for attaching to a motor vehicle, said plate having a socket for receiving the bill of the hook, a V-shaped guide mounted on the plate, the hook having a stop for supporting the hook above the plate when the bill is engaged in the socket.

2. In a trailer coupling, the combination of a hook comprising a pair of arms spaced apart at their rear ends for attachment to a trailer tongue and merged into a reduced shank at their forward ends, a down-turned bill on the forward end of the shank having a rounded nose at its lower end, an annular collar surrounding the bill above the nose, an inclined coupling plate having a guide and a socket within the guide, and a bracket at the upper end of the plate.

In testimony whereof I affix my signature.

HUBERT P. WILLIAMS.